PROBABILITY DISTRIBUTION OF X

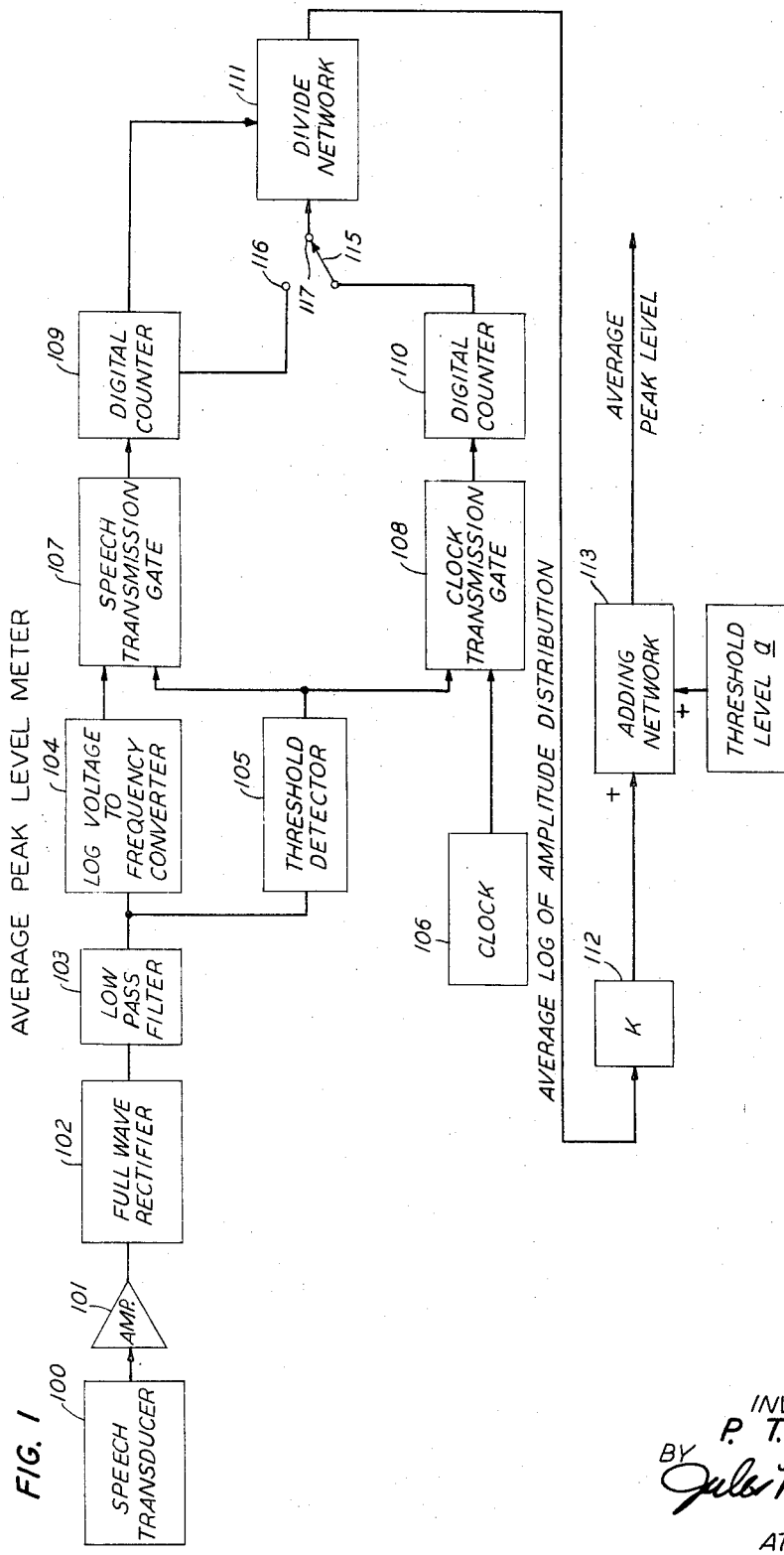
FIG. I

WHERE $X = 10 \log \dfrac{E^2/R}{E^2_{ref}/600} = 20 \log E + 2.22$ dbm a = apl METER THRESHOLD
b = PEAK OF DISTRIBUTION

CUMULATIVE DISTRIBUTION

FREQUENCY V. AMPLITUDE 3,346,694
SPEECH LEVEL MEASURING APPARATUS
Paul T. Brady, Maplewood, N.J., assignor to Bell Telephone Laboratories, Incorporated, New York, N.Y., a corporation of New York
Filed June 2, 1965, Ser. No. 460,108
11 Claims. (Cl. 179—1)

ABSTRACT OF THE DISCLOSURE

In general, the logarithm of the amplitude of the envelope of a speech signal during a given period of time and above a given threshold level is approximately uniformly distributed. Therefore, the average peak level of the speech signal over this period may be determined by multiplying the average logarithm of the envelope of the speech signal by a constant and adding the resulting product to the threshold.

Apparatus is described for automatically determining this average peak level of a complex speech signal.

---

This invention relates to an objective speech level measuring device and in particular to a device which measures over a selected time interval the average peak level of speech.

The measurement of the intensity of human speech is a problem of great importance in the design and operation of a communication system. The parameters such as peak, root-mean-square, or average voltage used to describe a periodic signal often have little or no meaning when applied to complex speech signals which include both periodic and nonperiodic portions. Yet, in order to design and operate a communication system so as to prevent system overload or extreme signal distortion, the level of the complex electrical signal derived from the acoustic speech waveform must be characterized in some meaningful manner.

In telephone systems, a special unit of measurement has been defined to characterize a complex speech signal and this unit is known as the "volume unit." The volume unit is not capable of being defined precisely in a mathematical sense, but rather "is simply the reading of an audio signal on a carefully specified volume indicator, called the VU meter, when the meter is read in a carefully specified fashion" by a trained observer, "Transmission Systems for Communications" page 20, 3rd Edition, Revised, published by Bell Telephone Laboratories, Incorporated. The VU meter gives a visual indication in VU units, which are proportional to decibels, of the peaks of the VU meter response to the complex speech signal, integrated over a short time period determined by the sluggishness of the meter indicator. The meter is designed to be a good indicator of the speech signal's peaks which vary with changes in syllables but to ignore or be unresponsive to the more rapidly varying peaks. The meter must be read by a trained observer and a standardized procedure has been adopted for reading the meter with the result that ideally a single volume measurement provides a single figure indicative of the speech volume over a portion of the speech several seconds in length, say 3 to 10 second. In practice, however, because of the human observer, the "vu" measurement used to describe the volume of any portion of a speech signal will vary depending on the particular observer and indeed, depending on how the particular observer reacts at any one time to the VU meter deflections. Studies have shown that the VU measurements from a particular portion of a complex speech signal by one particular observer have a standard deviation as large as 1.5 VU units, and that the VU measurements from the same portion of the speech signal by many different observers are influenced by an observer bias which has a range as large as about 3 VU units.

The present invention provides an arrangement, called the APL meter, to determine automatically, a one-dimensional measure of the intensity of a complex speech signal, this measure being known as the "average peak level" of the signal. It has been discovered that the probability distribution of the logarithm of the amplitude of a rectified speech signal's envelope above a wide range of thresholds is approximately uniform, despite the infrequent occurrence of singular loud sounds, when the envelope of the speech signal is determined in a specified manner. Moreover, it has also been discovered that when the logarithm of the amplitude of a rectified speech signal's envelope over a selected short time period possesses a truly uniform probability distribution, the peak value of this distribution is a good measure of the signal's intensity relative to a fixed reference level. The peak value relative to a fixed reference level of a variable with a uniform probability distribution can be obtained by measuring the average value of the variable relative to a threshold level, multiplying this value by two, and adding the resulting product to the threshold. By measuring the average logarithm of the amplitude of the rectified speech signal's envelope above a selected threshold, multiplying this value by two, and adding the resulting product to the threshold, the average peak level, defined as the peak value of a hypothetical uniform speech distribution possessing the measured average logarithm, is obtained with respect to a fixed reference level. This average peak level has been discovered to be approximately independent of the threshold used in its calculation over a wide range of thresholds and thus is a one-dimensional measure of the speech signal's intensity. Moreover, the APL meter used to obtain the average peak level requires no human observer and thus gives a more objective and more accurate measure of the intensity of speech than is possible from the VU meter.

In the APL meter of this invention an acoustic speech wave is converted into an electrical signal that is full-wave rectified, filtered, and applied to a logarithm to frequency converter. During those portions of the time interval in which amplitude of the speech signal's envelope exceeds a selected threshold, the output signal from the logarithm to frequency converter is integrated with respect to time to obtain a first signal proportional to the time integral of the logarithm of the speech envelope's amplitude above the selected threshold. A second signal proportional to the net time during which the speech envelope's amplitude exceeds the threshold is also obtained. The average value, in decibels, of the logarithm of the difference between the amplitude of the rectified speech signal's envelope and the threshold is determined by dividing the first signal by the second signal.

Since the logarithm of the speech envelope's amplitude of almost any speaker over a suitable time period and above a threshold has been discovered to be approximately uniformly distributed, the average peak level of the speech signal generated by any speaker over a selected and suitable short time interval is calculated in the APL meter by multiplying the average logarithm of the speech envelope's amplitude above a threshold by two and adding the threshold to the resulting product. The average peak level calculated by the APL meter in this manner is approximately independent of the meter's threshold for a wide range of thresholds.

Of course, to the extent that the distribution of the logarithm of the amplitude of the envelope of the rectified speech signal deviates from the expected uniform distribution, the average peak level as calculated by the APL meter will no longer be completely independent of the threshold. However, it has been shown that the variation in the measured average peak level over a range of thresholds due to the nonlinearity of this distribution is rarely more than one (1) decibel at the worst and thus the variation inherent in this measure of speech intensity is considerably less than the expected variation in VU meter readings.

Though the APL meter was developed to take advantage of the uniform distribution of the logarithm of a speech envelope's amplitude, the APL meter can also be used, with appropriate scale changes, to obtain the average peak level of any signal which has a probability distribution such that the average peak level of the distribution in any units can be calculated by multiplying the average value of the distribution above some threshold by a constant which is not a function of the threshold and then adding the product so obtained to the threshold. The average peak level so obtained is independent of the threshold and is thus a one-dimensional measure of the intensity of the signal.

This invention will be fully understood from the following detailed description taken in conjunction with the included drawings in which:

FIG. 1 is a schematic drawing of the average peak level meter of this invention;

*Analytical considerations*

Figure 2A:
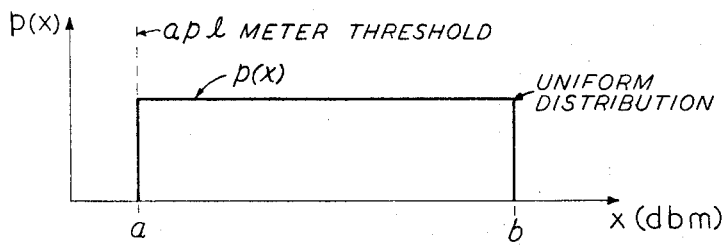
FIGS. 2a and 2b are plots of the probability density and cumulative probability respectively of a given speech amplitude versus the amplitude in decibels.
Figure 2B:
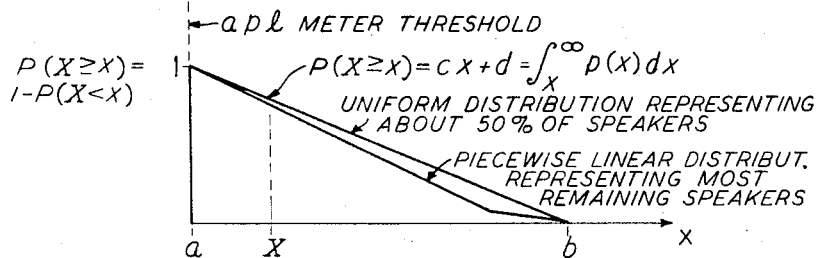

Turning first to FIG. 2b, there is shown in this drawing a typical cumulative probability function for the amplitude, $x$, in decibels of power or dbm, of the envelope of a typical speaker's rectified speech signal. The envelope of a rectified speech signal is defined as the output signal obtained by passing the rectified speech signal through a low pass filter with a carefully selected time constant on the order of magnitude of 2.5 milliseconds. The variable $x$ is defined as $$x(\text{in dbm}) = 20 \log_{10} E + 2.22 \qquad (1)$$

where E is the instantaneous voltage of the rectified speech signal's amplitude, and 2.22 is a constant derived from the definition of the reference or zero decibel power level as 0.775 volt RMS, which is the voltage necessary to dissipate one milliwatt of power in a 600 ohm resistor. The first term on the right hand side of Equation 1 is just the voltage level in decibels, known as dbv, referred to a zero decibel reference voltage of one (1) volt. The choice of decibels of power, dbm, rather than decibels of voltage, dbv, for the variable $x$ is merely one of preference and what is said with respect to the one is valid with respect to the other unless the distinction is specifically pointed out.

As shown by the straight unbroken line in FIG. 2b, the cumulative distribution, $P(X \geq x)$, of the logarithm of the amplitude of the envelope of a rectified speech signal above a selected threshold measured over a time period of four seconds is given by an equation of the form $P(X \geq x) = cx + d$, where $c$ is the slope and $d$ is the y intercept constant.

The probability density function $p(x)$ is obtained by differentiating $P(X \geq x)$ with respect to $x$. Accordingly, $p(x)$ is found to equal the constant $c$ in the region where $x$ is realizable and thus $x$, the logarithm of the amplitude of the envelope of the rectified speech signal is uniformly distributed over the range of realizable speech amplitudes as shown by the graph of $p(x)$ in FIG. 2a.

It should be noticed that FIG. 2b also shows a cumulative distribution function representative of a small class of speakers, which is piecewise linear, as shown by the two straight lines of difference slopes. The average peak level of speech from this class of speakers, calculated from such piecewise linear distributions, varies by approximately one decibel or less as the threshold is varied over a range of about +15 decibels from a nominal threshold of −30 decibels. This variation is relatively insignificant when compared to the range of VU meter readings obtained by different observers from a given speech signal. Thus the uniform probability distribution $p(x)$ of $x$, shown in FIG. 2a, can be written as $$\begin{aligned} p(x) &= 1/(b-a) \quad a \leq x \leq b \\ &= 0 \quad x < a \\ & \quad\quad x > b \end{aligned} \qquad (2)$$

In Equation 2, $b$ is the peak level of the probability distribution $p(x)$ in dbm and $a$ is the threshold level in dbm which, when exceeded by a speech wave, defines the existence of speech.

The average value of the variable $x$ between the threshold $a$ and the peak level $b$ is defined as $$\bar{x} = \frac{\int_a^b x p(x) dx}{\int_a^b p(x) dx} \qquad (3)$$

The integral in the denominator is a normalizing factor to ensure that the total probability represented by the area under $p(x)$ between $a$ and $b$ is just unity.

Substituting the uniform distribution given in Equation 2 into Equation 3 and integrating, the average value of the variable $\bar{x}$ is found to be $$\bar{x} = (b+a)/2 \qquad (4)$$

The average peak level meter of this invention detects only the average value of $x$ above the threshold $a$, that is, the quantity used for computation by the APL meter is just $(\bar{x} - a)$. Because the probability distribution $p(x)$ is uniform, the average peak level with respect to the threshold $a$ is just twice the quantity $(\bar{x} - a)$. But the average peak level of the uniform distribution with respect to the reference level of 0 dbm is twice the quantity $(\bar{x} - a)$ plus the threshold $a$. Thus $$APL = 2(\bar{x} - a) + a \qquad (5)$$

Substituting Equation 4 into Equation 5 yields as expected the result that $$APL = b \qquad (6)$$

Equation 6 shows that the average peak level in decibels for a simple uniform distribution equals the peak level, $b$, of the uniform distribution and is independent of the meter threshold used in its derivation and thus is truly a one-dimensional measure of the level of the speech wave.

If it is now assumed that the probability density $p(x)$ is given by the following general expression, $$p(x) = m(b-x)^n \qquad (7)$$

where $m$ is an appropriate constant and $n$ is greater than minus one (−1), then by substituting Equation 7 into Equation 3 the average value of $x$ can easily be calculated by carrying out the indicated integration. The result in general is $$\bar{x} = a + (b-a)/(n+2) \qquad (8)$$

Since the APL meter measures the average value of $x$ above the threshold $a$, the average peak level of $p(x)$ with respect to a reference level of 0 dbm is found by multiplying the difference $(\bar{x} - a)$ by a constant $k$, where $k$ is independent of the threshold $a$ and then adding the resulting product to the threshold value $a$. This relationship is expressed in the form of an equation as follows:

$$APL = k(\bar{x} - a) + a \qquad (9)$$

If Equation 8 is substituted into Equation 9, the average peak level is found to be $$APL = k(b-a)/(n+2) + a \qquad (10)$$

The distribution peak level is known to be $b$. If the probability distribution given by Equation 7 is a valid representation of the distribution of the amplitude of the signal whose intensity is being measured, then the average peak level should equal the distribution peak level. Substituting $b$ for the average peak level in Equation 10 and solving for $k$, it is found that $k=(n+2)$. Accordingly, the general equation for the average peak level is $$\text{APL} = (n+2)(\bar{x}-a) + a \tag{11}$$

Equation 11 represents symbolically the steps by which the APL meter calculates the average peak level of a signal which possesses an amplitude distribution of the form given by Equation 7. First the APL meter calculates the average value of the quantity $(x-a)$. This average value is just $(\bar{x}-a)$ since $a$ is the APL meter's threshold and thus is constant. Then the APL meter must multiply the quantity $(\bar{x}-a)$ by the constant $(n+2)$. Finally the product $(n+2)(\bar{x}-a)$ must be added to the threshold value $a$ to obtain the average peak level. Even though the threshold $a$ must be known to correctly calibrate the APL meter to carry out the above calculation, once the average peak level is obtained, it is independent of the threshold $a$, and is thus a one-dimensional measure of the level of the signal. Of course, if the signal has a probability distribution such that the constant $k$ in Equation 10 is not independent of the threshold $a$, then the average value of the signal's amplitude distribution is not related to the peak level of the distribution by a constant $k$ independent of the threshold $a$. In that case, the average peak level, through still independent of the threshold once it has been obtained, is no longer a one-dimensional measure of the level of the signal because of the necessity for specifying the threshold used in the average peak level's calculation.

*Average peak level meter*

Turning now to FIG. 1, there is shown a schematic block diagram of the average peak level meter of this invention. Speech sounds are detected by speech transducer 100 and converted into a complex electrical signal. This signal is amplified in amplifier 101 and then full wave rectified in rectifier 102. The signal could of course be half wave rather than full wave rectified if so desired. The full wave rectified speech signal from rectifier 102 is then passed through the low pass filter 103 to obtain an envelope of the speech signal. The time variation of the rectified speech signal's envelope and thus the probability distribution of the logarithm of the envelope's amplitude depends on the time constant selected for low pass filter 103. A certain amount of filtering is desirable to allow the envelope to vary at a low enough rate to simplify the construction of the circuits of the APL meter. It has been found that a time constant with an order of magnitude of about 2.5 milliseconds ensures in most cases that the logarithm of the amplitude of the rectified speech signal's envelope is approximately uniformly distributed.

The rectified speech envelope from filter 103 is sent to the log-voltage to frequency converter 104 where the logarithm of the voltage representing the speech envelope is converted into a signal having a frequency proportional to the logarithm of the amplitude of the rectified speech signal's envelope. Methods of converting a voltage to a signal proportional to the logarithm of the voltage and of converting a voltage to a frequency proportional to the voltage are well known in the art. See Vanderlyn Patent 2,662,213 issued Dec. 8, 1953 and Grosdoff Patent 2,496,-912 isued Feb. 7, 1950 for examples of these devices. The signal representing the speech envelope is also sent to the threshold detector 105 where it is used to open two transmission gates 107 and 108 during the time periods the speech signal's envelope exceeds the threshold voltage. Transmission gate 107 passes the frequency signal generated by the log-voltage to frequency converter 104 to a digital counter 109 which integrates the frequency with respect to time by counting the number of cycles passed by gate 107. Threshold detector 105 also activates a second transmission gate 108 which passes timing pulses from clock 106 to a second digital counter 110. Counter 110 measures the net time during which the speech signal's envelope pased by filter 103 exceeds the threshold level in detector 105. The accumulated count in counter 109 is divided by the accumulated count in counter 110 in dividing network 111. This division process is performed after the speech signal has exceeded the speech threshold for a specified time. For example, if four seconds of speech are required before the distribution of the logarithm of the amplitude of the speech signal assumes a uniform distribution, then this division process will occur only when the speech signal's envelope has exceeded the threshold level in detector 105 for a total net time of four seconds. Thus in this embodiment, the division process carried out in dividing network 111 is a discrete rather than continuous operation, and occurs only after each four seconds of net speech burst time. Of course, if desired, the division process could take place after any other number of seconds of net speech burst time.

The output signal from dividing network 111 gives the average logarithm of the speech signal's amplitude distribution above the selected threshold $a$ and is equivalent to the quantity $(\bar{x}-a)$ in Equation 11. This average logarithm is multiplied by the appropriate value of the constant $k=n+2$, as defined in Equations 10 and 11, in digital multiplying network 112. This network may be basically a high speed digital counter activated by the output signal from dividing network 111. The output signal from network 112 is added to the threshold $a$, defined in Equation 2, in a digital adder and the output signal from the summing network is equal to the average peak level in accordance with Equation 11.

As an alternative method of obtaining the average peak level, it is possible to calibrate the APL meter in such a manner that the cycle count in the first counter 109 represents directly the average peak level of the speech after a fixed net speech time has elapsed. This mode of operation is activated by switching the arm of switch 115 from contact 117 to contact 116.

Figure 3:
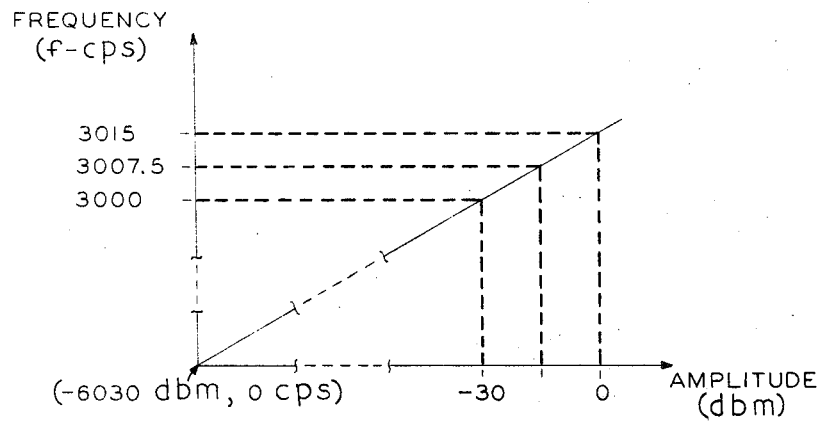
FIG. 3 is a graph of frequency versus input voltage for the log-voltage to frequency converter used in the APL meter of this invention.

To operate the APL meter in this mode, the technique of calibrating the APL meter must be understood. Turning now to FIG. 3, there is shown a graph of the frequency of the output signal from the log-voltage to frequency converter 104 versus the log of the input voltage in dbm. The threshold level which the amplitude of the envelope of the rectified speech signal must exceed before the digital counters 109 and 110 are activated is shown as −30 dbm. This particular threshold level is chosen for illustrative purposes only and it is understood that the threshold could be any other desired value. It is seen from FIG. 3 that the output frequency corresponding to the threshold level is not zero cycles per second but rather is about 3000 cycles per second. This frequency was selected arbitrarily for illustrative purposes and is at the bottom of the range of desirable frequencies because the higher the frequency associated with the threshold level, the lower the uncertainty in the count condition in digital counter 109 at the end of a predetermined time interval. The count condition in digital counter 109 at any time is proportional to the time integral of the output signal $f$, from the log-voltage to frequency converter, $$\int_{t_1}^{t_2} f \, dt$$

during the times the amplitude of the rectified speech signal's envelope exceeds the threshold level.

It is desired to have the count condition in digital counter 109 reflect directly the average peak level of the input speech signal after the amplitude of the rectified speech signal's envelope has exceeded the threshold for, as an example, four seconds. The expiration of this time period is indicated by a signal from counter 110. If the amplitude of the rectified speech signal's envelope just equals the threshold of −30 dbm for four seconds, digital counter 109 must be preset with a count condition of −12030 because the total integral of the frequency of the signal from the log-voltage to frequency converter 104 is equal to +12000 while the average peak level of the rectified speech signal is −30 dbm. Thus the count condition in counter 109 must at any time be equal to the function $$\int_{t_1}^{t_2} f dt - 12030$$

The problem now is to determine the slope of $f$ as a function of the logarithm of the amplitude of the rectified speech signal's envelope. This can be done quite easily by noticing that if the average logarithm of the amplitude of the rectified speech signal's envelope is for example −15 dbm, the average peak level of the rectified speech signal is 0 dbm. Accordingly, the slope of the output frequency versus amplitude curve must be, for a four second measuring period, 1 c.p.s. per 2 dbm input or 2 cycles per average dbm input must occur over the four second measuring period. If the input signal is on the average 10 dbm above the −30 dbm threshold, the total number of cycles generated is 12020 which when added to the −12030 initial count condition in counter 109 gives an average peak level reading of −10 dbm which is of course, the correct reading.

It is possible to generate both a constant frequency signal proportional to the threshold level and a variable frequency signal proportional to the instantaneous magnitude of the input signal, and integrate only the difference between these two signals in counter 109. In this case, using the above figures, counter 109 would be present with a count condition of −30 and an input voltage 10 dbm on the average above the −30 dbm threshold would generate 20 cycles of difference frequency in counter 109 in four seconds. Thus the count condition in counter 109 would again be −10 dbm, the correct average peak level reading for the given amplitude input signal.

Other embodiments of this invention will be obvious to those skilled in the speech measuring and electrical signal measuring arts. It is to be understood that the APL meter can be utilized to determine an objective measure of any complex signal which has an amplitude probability distribution such that the average peak level of the distribution either in decibels or some other units can be determined by multiplying the average value of the distribution above a threshold by a constant independent of the threshold and adding the resulting product to the threshold. In particular, it is to be understood that any signal which has an amplitude probability distribution of the form $p(x) = m(b-x)^n$ where $-1 < n < \infty$, $m$ is any suitable positive constant, and $x$ is the signal's amplitude in any appropriate unit where $a \leq x \leq b$, and $a < b$, can be analyzed by the APL meter.

What is claimed is:

1. Apparatus for automatically obtaining a one-dimensional measure of the level of a speech signal above a selected threshold, which comprises means for generating from said speech signal a variable frequency signal wherein said frequency is proportional to the amplitude of the logarithm of the level of the envelope of a rectified version of said speech signal, processing means including means for integrating said variable frequency signal with respect to time whenever the level of the envelope of said rectified version of said speech signal exceeds said selected threshold and means for obtaining an average frequency which is proportional to the average logarithm of the level of said envelope above said selected threshold, and means for deriving from said average frequency the average peak level of the envelope of said rectified speech signal over a predetermined time period, said average peak level being independent of the threshold and thus being a one-dimensional measure of the level of said speech signal.

2. Apparatus as recited in claim 1 wherein said processing means comprises first means for counting the number of cycles of said variable frequency signal during the time the level of the envelope of said rectified speed signal exceeds said selected threshold, second means for counting the number of pulses from a timing source in order to obtain the net time during which said rectified version of said speech signal exceeds said selected threshold, and means for dividing the count in said first counting means by the count in said second counting means in order to obtain an average frequency which is proportional to the average logarithm of said envelope above said selected threshold.

3. Apparatus as recited in claim 1 wherein said means for deriving the average peak level of the envelope of said rectified speech signal comprises means for multiplying said average frequency by a constant $k$ independent of said selected threshold to obtain a signal proportional to $k(\bar{x}-a)$, said constant $k$ having the value two when the envelope of said rectified speech signal has approximately a uniform probability distribution, $\bar{x}$ being equal to the average logarithm of said envelope, and $a$ being equal to said selected threshold, and means for adding said signal obtained from said multiplying means to said selected threshold to obtain a second signal representative of the average peak level of said speech.

4. Apparatus for obtaining a one-dimensional measure of the intensity of a speech signal which comprises means for generating a variable frequency signal with a frequency proportional to the logarithm of the amplitude of the envelope of a rectified version of said speech signal, means for counting the number of cycles of said variable frequency signal during the time the amplitude of the envelope of said rectified version of said speech signal exceeds a selected threshold, means for measuring the net time during which the amplitude of the envelope of said rectified version of said speech signal exceeds said selected threshold, means for dividing the output signal of said counting means by the output signal of said measuring means at the end of a preselected time period to obtain a second signal proportional to the average logarithm of said envelope's amplitude over said preselected time period, means for multiplying said second signal by a constant independent of said selected threshold to obtain a product representative of the average peak level of the envelope of said rectified speech above said threshold, and means for adding said product from said multiplying means to said selected threshold thereby to obtain a number representing the average peak level of said speech, said average peak level being independent of said selected threshold and thus being a one-dimensional measure of the intensity of said speech signal.

5. Apparatus for obtaining automatically a one-dimensional measure of the level of a complex signal the envelope of which possesses an amplitude with a probability distribution $p(x)$ of the form $p(x) = m(b-x)^n$, where $m$ is a constant selected so that the total probability of all amplitudes is one, $b$ is the peak of the distribution of the complex signal's envelope, $x$ is the instantaneous amplitude of the envelope of a rectified version of the complex signal and $n$ is any number greater than minus one and less than infinity, $(-1) < n < \infty$, which comprises means for obtaining a variable frequency signal with a frequency proportional to the logarithm of the amplitude of the envelope of said rectified version of said complex signal, processing means including means for integrating said variable frequency signal over a predetermined time period whenever the amplitude of the envelope of said rectified version of said complex signal exceeds a selected threshold and means for obtaining an average frequency which is proportional to the average logarithm of the amplitude of said envelope above said selected threshold, and means for deriving from this average frequency the average peak level of said rectified version of said complex signal over said predetermined time period, said average peak level being independent of said selected threshold and thus being a one-dimensional measure of said complex signal.

6. Apparatus as recited in claim 5 wherein said processing means comprises first means for counting the number of cycles of said variable frequency signal during the time the amplitude of the envelope of said rectified version of said complex signal exceeds said selected threshold, second means for counting the number of pulses from a timing source in order to obtain the net time during which the amplitude of the envelope of said rectified version of said complex signal exceeds said selected threshold, and means for dividing the count in said first counting means by the count in said second counting means in order to obtain an average frequency which is proportional to the average logarithm of the amplitude of said envelope above said selected threshold.

7. Apparatus as recited in claim 5, wherein said means for deriving the average peak level of the rectified version of said complex signal comprises means for multiplying said average frequency by a constant proportional to $(n+2)$ to obtain a second signal proportional to the product $(n+2)(\bar{x}-a)$, the term $\bar{x}$ being equal to the average logarithm of the amplitude of the envelope of the rectified version of said complex signal, and $a$ being the selected threshold, and means for adding said second signal obtained from said multiplying means to said selected threshold to obtain a signal representative of the average peak level of the rectified version of said complex signal, said average peak level being independent of the threshold used in its derivation and therefore being a one-dimensional measure of the intensity of said complex signal.

8. Apparatus for measuring the intensity of an electrical signal which comprises means for full-wave rectifying said complex signal, means for deriving the envelope of said rectified complex signal, means for generating a variable frequency signal with a frequency proportional to the logarithm of the amplitude of the envelope of said rectified electrical signal, processing means including means for integrating said variable frequency signal over a selected time interval during which the amplitude of said envelope exceeds a selected threshold and means for obtaining a third signal proportional to the average logarithm of the amplitude of said envelope above said selected threshold over said selected time interval, and means for converting said average logarithm of the amplitude of said envelope above said selected threshold to the average peak level of said electrical signal, said average peak level being a measure of the intensity of said electrical signal.

9. Apparatus for obtaining automatically a one-dimensional measure of the intensity of a complex signal, the amplitude of the envelope of a rectified version of said complex signal possessing a log-uniform distribution, which comprises means for obtaining over a selected time period the average logarithm of the amplitude of that part of the envelope of the rectified version of said complex signal above a selected threshold, said average logarithm being related to the average peak level of the envelope of the rectified version of said complex signal by a constant of proportionality independent of said selected threshold, and means for obtaining from this average logarithm the average peak level of the envelope of the rectified version of said complex signal, said average peak level being a one-dimensional measure of the intensity of said complex signal.

10. Apparatus as defined in claim 5 wherein said processing means and said means for deriving comprise:

means for counting the number of cycles of said variable frequency signal over a predetermined time period during which the level of the envelope of said rectified version of said complex signal is above said selected threshold, and means for holding the output signal from said counting means to its value at the end of said predetermined period, said counting means being adjusted so that said output signal indicates directly the average peak level of said complex signal.

11. Apparatus for automatically obtaining a one dimensional measure of the level of a speech signal above a selected threshold which comprises:

means for generating from said speech signal a variable signal whose frequency is proportional to the amplitude of the logarithm of the level of the envelope of the rectified version of said speech signal;

controllable means for counting the number of cycles of said variable frequency signal over a predetermined time period during which the level of the envelope of said rectified speech signal is above said selected threshold, said counting means being preadjusted to indicate directly the average peak level of said rectified speech signal at the end of said predetermined period;

means for producing timing pulses; and means for applying said timing pulses to said counting means to hold the output count from said counting means at the end of said predetermined period.

References Cited

UNITED STATES PATENTS

| | | | |
|---|---|---|---|
| 2,313,666 | 3/1943 | Peterson | 324—111 |
| 2,590,460 | 3/1952 | Rackey et al. | 181—0.5 |
| 2,600,423 | 6/1952 | Nolle | 324—119 |

BENJAMIN A. BORCHELT, *Primary Examiner.*

SAMUEL FEINBERG, *Examiner.*

W. KUJAWA, *Assistant Examiner.*